Patented Dec. 3, 1929

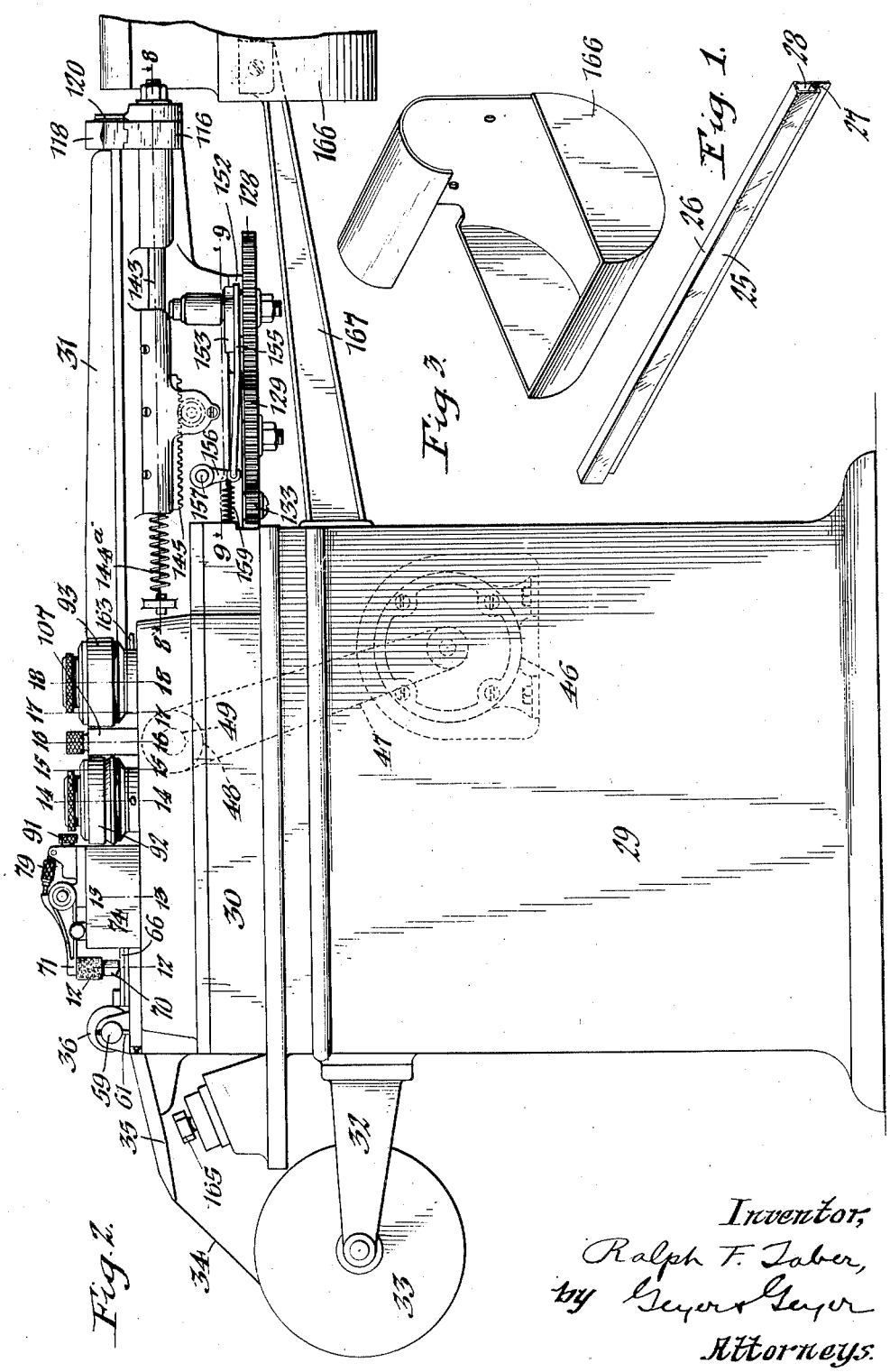

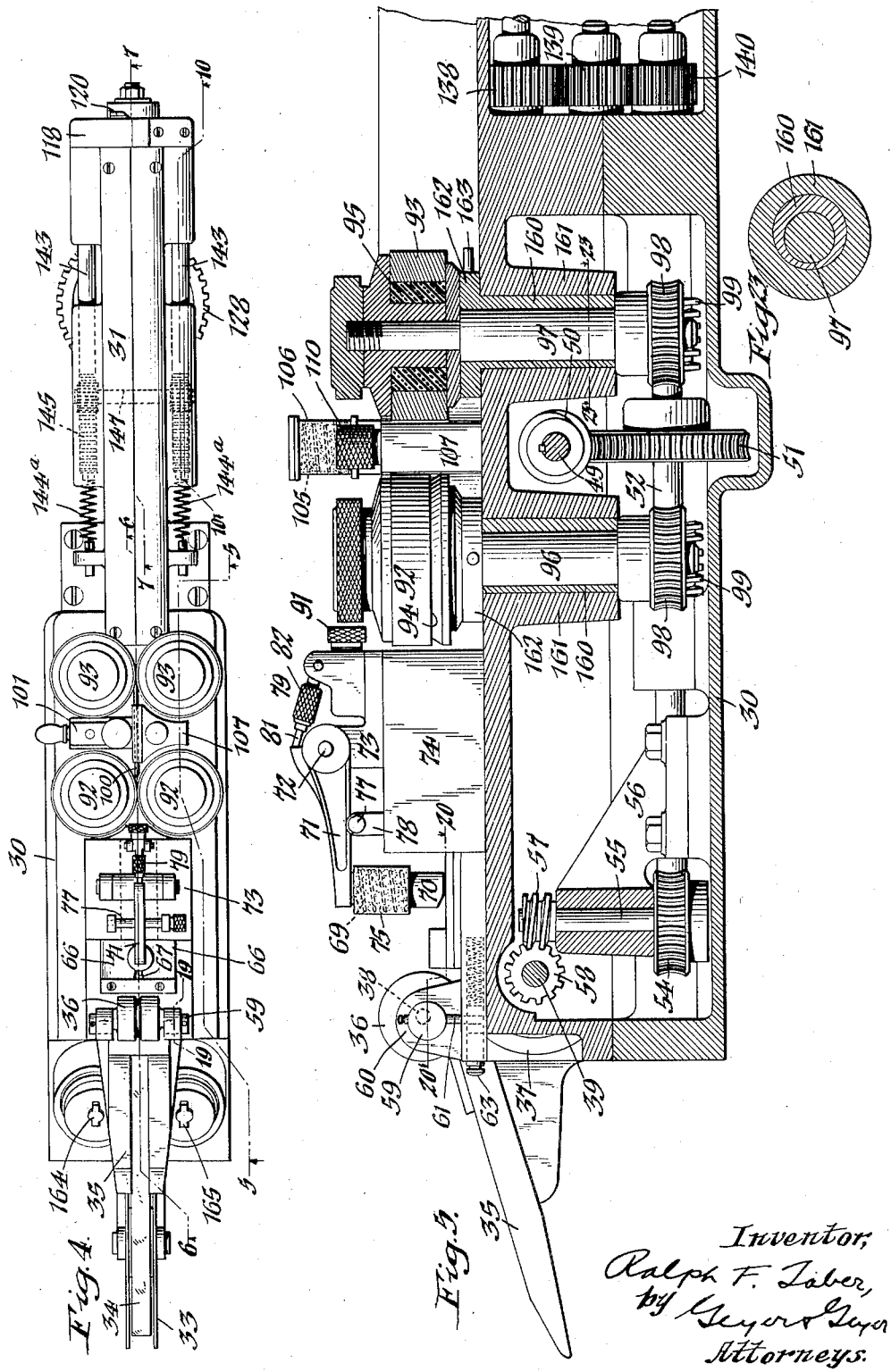

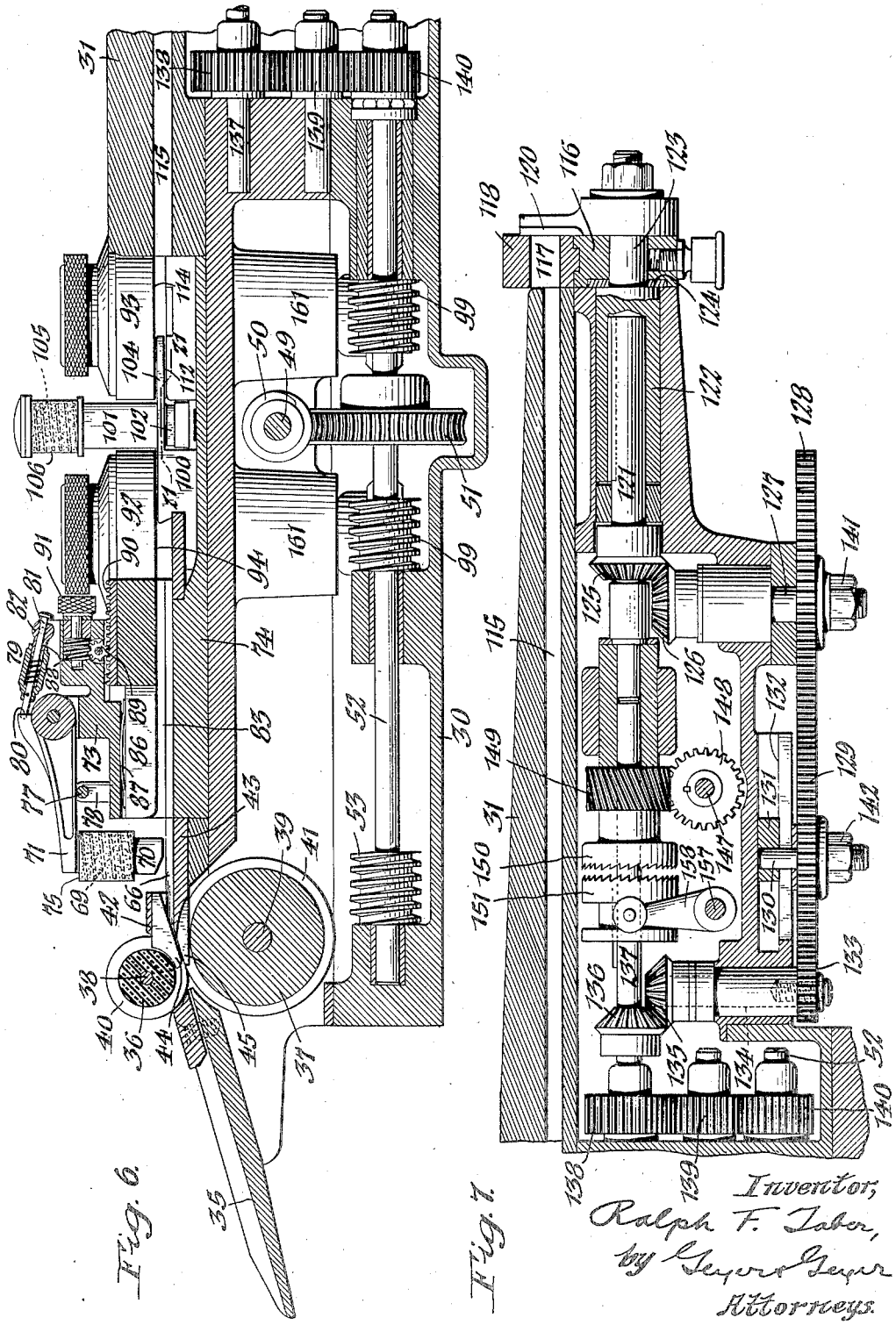

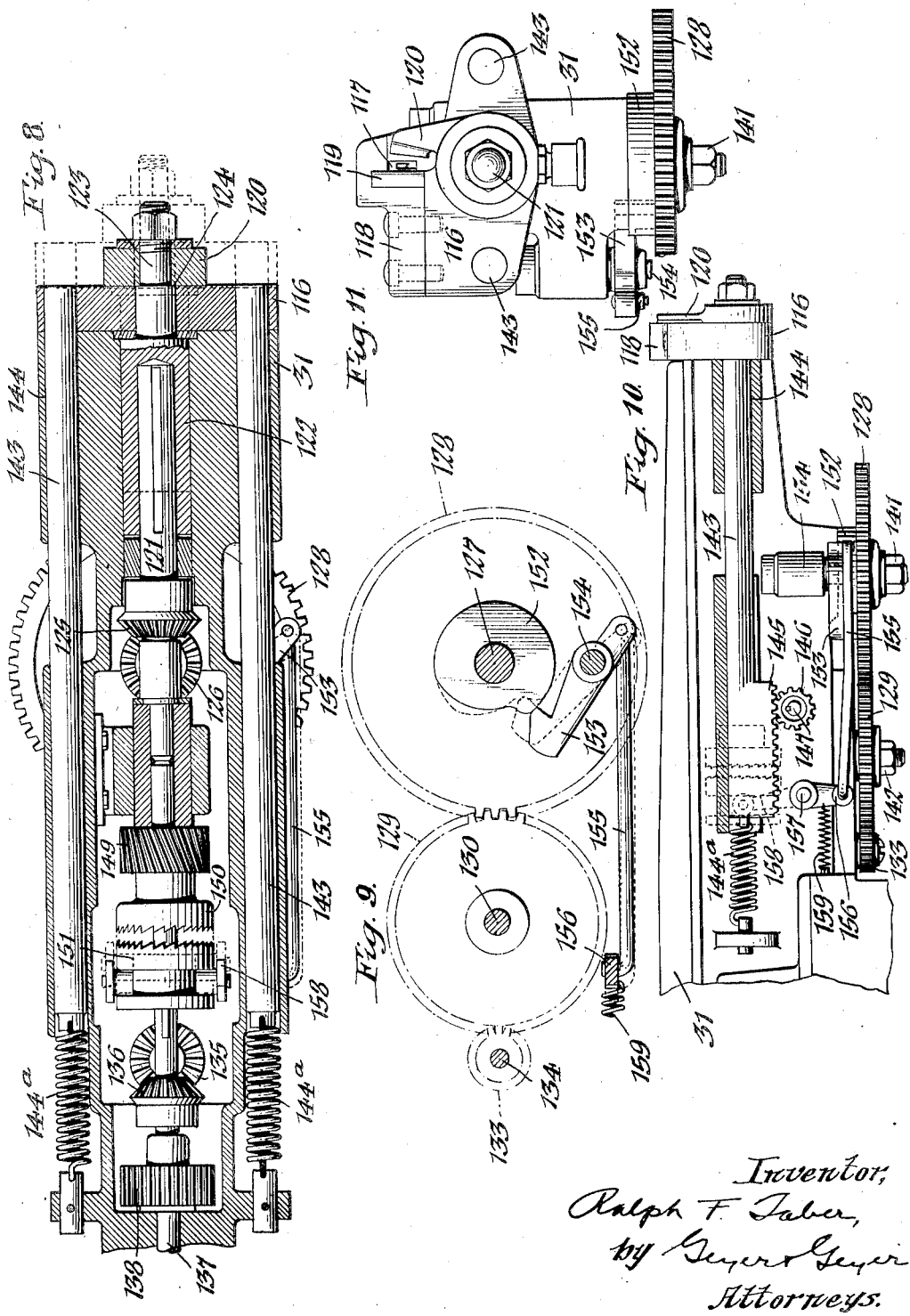

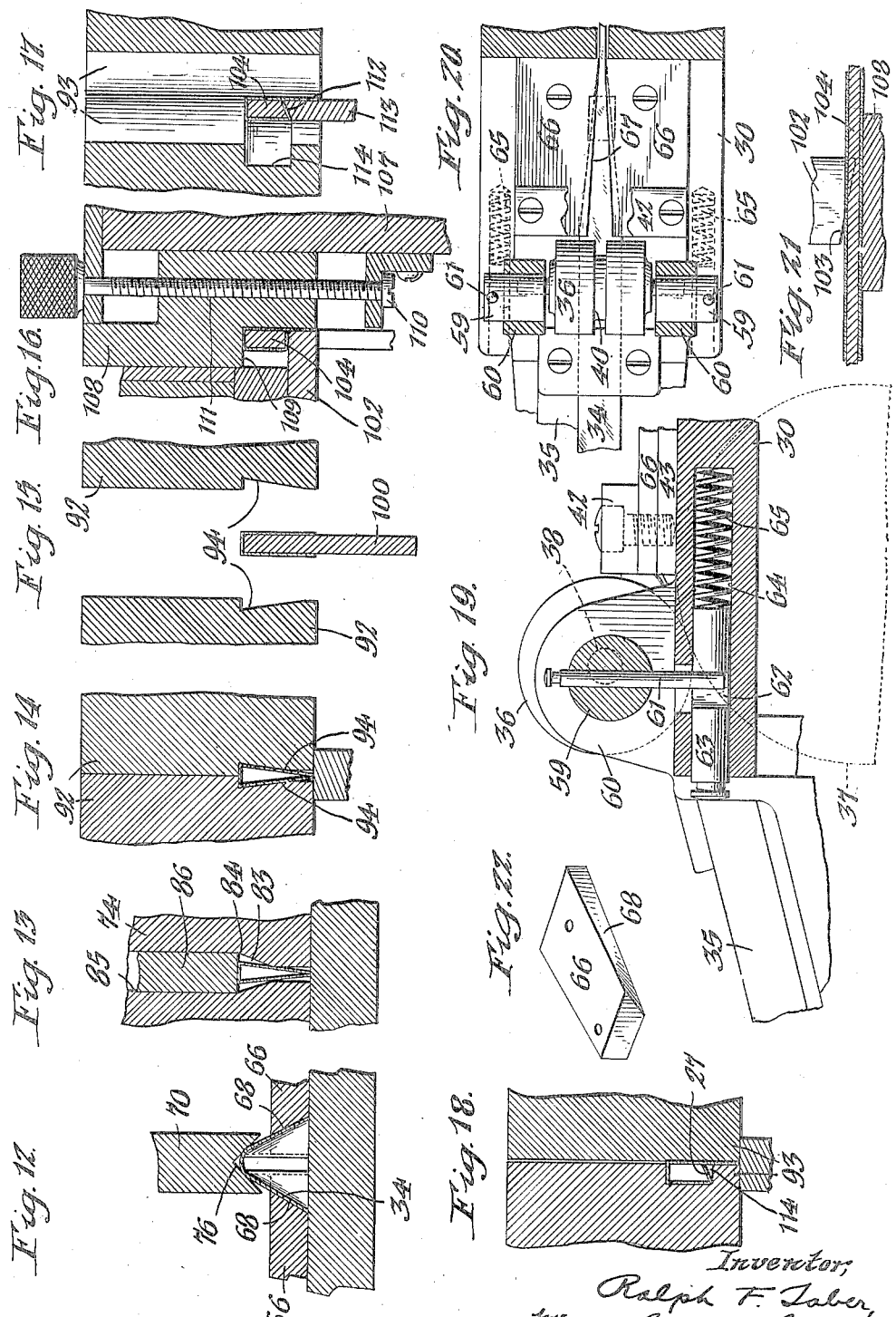

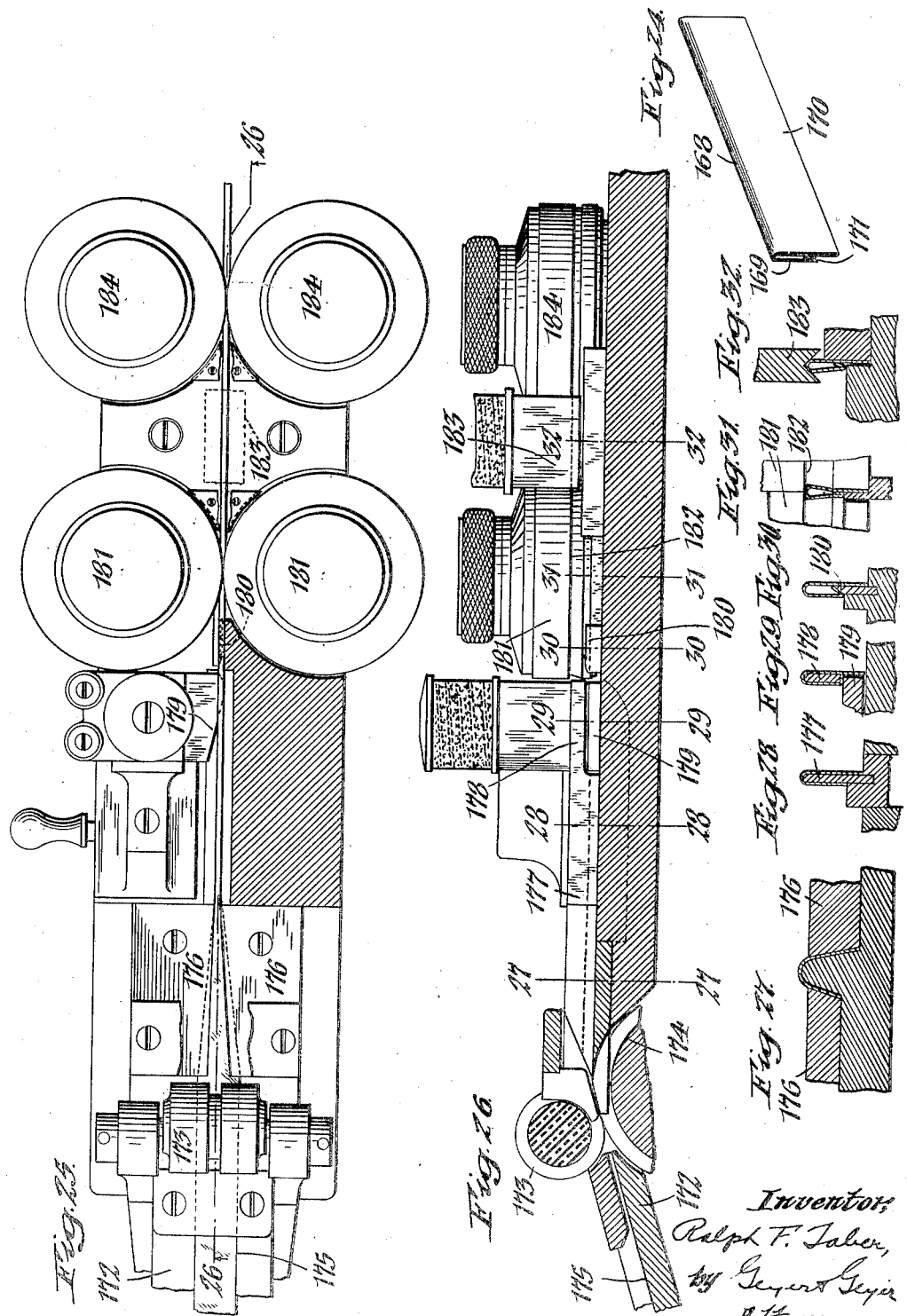

1,738,334

UNITED STATES PATENT OFFICE

RALPH F. TABER, OF NORTH TONAWANDA, NEW YORK, ASSIGNOR, BY MESNE ASSIGNMENTS, TO REMINGTON RAND INC., OF NEW YORK, N. Y., A CORPORATION OF DELAWARE

METHOD OF AND MACHINE FOR MAKING INDEX TUBES

Application filed December 29, 1924. Serial No. 758,748.

This invention relates to a method of and machine for making the transparent protective sheaths or tubes for removably receiving index slips.

Its chief object is to provide a novel and efficient method and a reliable and automatic machine for expeditiously making such index tubes.

Another object of the invention is the provision of a machine of this character which is simple and compact in construction, whose parts are so organized and arranged that they are not liable to get out of order, and which can be operated at a minimum expenditure of power and labor.

The invention consists further in various details of construction and arrangement of parts which will be hereinafter described and particularly pointed out in the appended claims.

In the accompanying drawings:

Figure 1 is a perspective view of an index tube or sheath constructed in accordance with this invention. Figure 2 is a side elevation of the machine. Figure 3 is a perspective view of the receptacle for receiving the finished tubes discharged from the machine. Figure 4 is a top plan view of the machine. Figures 5, 6 and 7 are enlarged vertical longitudinal sections on the correspondingly numbered lines in Figure 4. Figure 8 is an enlarged horizontal section on line 8—8, Figure 2. Figure 9 is an enlarged horizontal section on line 9—9, Figure 2. Figure 10 is an enlarged vertical longitudinal section on line 10—10, Figure 4. Figure 11 is a fragmentary end view of the cutter and associated parts. Figures 12 to 18 inclusive are enlarged fragmentary transverse sections taken in the plane of the correspondingly numbered lines in Figure 2, showing the various steps in the formation of the index tube. Figure 19 is an enlarged longitudinal section on line 19—19, Figure 4. Figure 20 is an enlarged horizontal section on line 20—20, Figure 5. Figure 21 is an enlarged horizontal section on line 21—21, Figure 6. Figure 22 is a perspective view of one of the folding die plates. Figure 23 is a horizontal section on line 23—23, Figure 5. Figure 24 is a perspective view of another form of tube or sheath. Figure 25 is a fragmentary top plan view, partly in section, of a modified form of the invention for making this form of tube. Figure 26 is a longitudinal section thereon on line 26—26, Figure 25. Figures 27 to 32 inclusive are enlarged transverse sections on the correspondingly numbered lines in Fig. 26.

Similar characters of reference indicate corresponding parts throughout the several views.

The index tube or sheath made by this improved machine and shown in Figure 1, consists of a comparatively stiff transparent body 25 of celluloid or similar material. The upper longitudinal edge of the sheath-body has a fold 26 and the lower edge of one of its side walls is turned inwardly toward the other wall to form a retaining lip 27, thereby providing a pocket 28 for receiving an index slip.

In its general organization, this improved machine comprises means for guiding and feeding a celluloid strip continuously therethrough, mechanism for folding or doubling the strip upon itself in the direction of its length, means for applying heat to the fold of such strip for the purpose of permanently forming its fold, means for bending or forming the inturned lip 27 on the strip, and cutting mechanism for severing the finished tubes into predetermined lengths ready for use.

In the embodiment of the invention shown in Figs. 1 to 23 inclusive, the working parts of the machine may be supported on a hollow standard or pedestal 29 provided at its upper end with a super-frame or casing 30 having a longitudinal extension or arm 31 overhanging the rear end of the standard. Journaled on a bracket 32 at the front end of the standard is a supply drum or reel 33 upon which the transparent strip 34 for making the index tube is wound. Disposed above this reel and extending forwardly from the front end of the super-frame is a centrally grooved guide plate 35 over which the transparent strip passes before being presented to the various mechanisms for shaping the strip into tubular form.

The transparent strip 34 is fed through the machine between upper and lower feed rollers 36, 37 which are mounted on horizontal shafts 38, 39, respectively, suitably journaled at the front end of the super-frame of the machine. As shown in Figs. 4 and 6, the feed rollers are provided in their peripheries with annular grooves 40, 41, the upper roller being preferably constructed of rubber and the lower or driving roller being constructed of steel or similar material. Located at the intersection of these feed rollers and at the rear sides thereof are upper and lower transverse plates 42, 43 which are provided at their front ends with guide tongues or projections 44, 45 arranged to enter the corresponding grooves of the feed rollers. These tongues serve to guide the strip after leaving the feed rollers and preparatory to being presented to the folding mechanism and prevent said strip from buckling or being diverted from its upper course. Motion is transmitted to these feed rollers to propel the strip at the proper speed through the machine preferably from an electric motor 46 mounted on the standard 29 and connected by a sprocket chain 47 with a sprocket wheel 48 mounted on a transverse driving shaft 49 supported at its ends in suitable bearings formed on the super-frame 30. Fixed on this driving shaft is a worm 50 meshing with a worm wheel 51 mounted on a longitudinal shaft 52 arranged centrally of the super-frame and journaled at its ends thereon. At its front end said longitudinal shaft carries a worm 53 engaging a worm wheel 54 mounted on the lower end of an upright shaft supported in a suitable bracket 56, the upper end of this shaft being provided with a worm 57 meshing with a worm wheel 58 mounted on the lower feed roller shaft 39.

For the purpose of positively maintaining the feed rollers 36, 37 in proper frictional engagement at all times, one of them is mounted for oscillating movement about an axis eccentric to its axis of rotation, and means are provided for yieldingly resisting such movement in a direction away from the companion feed roller. To attain this result, the ends of the upper roller shaft 38 are eccentrically mounted in trunnions 59 journaled in suitable bearing-brackets 60 applied to the upper side of the super-frame 30 of the machine. As shown in Fig. 19, these trunnions carry radial pins 61 which engage corresponding grooves 62 formed in the sides of horizontally movable plungers 63 guided in openings 64 formed in the adjacent portion of the machine-frame. Coil springs 65 arranged in said openings and bearing against the inner ends of the plungers serve constantly to project them outwardly and rock the trunnions in the proper direction to bring the upper feed roller into frictional contact with the companion feed roller.

After leaving the feed rollers the tube forming strip 34 is presented to a folding mechanism which preferably consists of two dies or plates 66, 66, arranged side by side lengthwise of the machine and spaced apart transversely from end to end thereof to form a longitudinal opening 67 between them, said opening gradually and uniformly tapering from its front end to the rear end thereof. The opposing faces of these plates are so shaped as to gradually bend or fold the strip in the direction of its length into inverted U-form and for this purpose the opposing faces 68, 68 of said plates are approximately spiral-like in form, the pitch gradually increasing from the front to the rear ends of the plates. The thickness of the latter is such that the fold of the strip projects slightly through the opening 67 and the sides of the strip engage the spiral faces 68.

In order to properly maintain the fold of the strip after being doubled upon itself in passing between the die-plates, it is necessary to subject such fold to heat and pressure. The preferred means for thus heating the fold of the strip consists of an electric heater consisting of a coil of wire 69 wound around a metallic core or heater iron 70 and having its ends connected to a suitable source of electricity. As shown in Figure 6, this heating iron is disposed in an upright position directly above the tapered opening formed between the die-plates 66, 66 and is mounted on a vertically swinging arm 71 pivoted at 72 to a longitudinally-adjustable slide or carrier 73 supported on a block 74 secured to the top side of the super-frame of the machine. The heating coil 69 may be wrapped or enclosed within a suitable insulated covering 75 and the heating iron is provided at its bottom edge with a substantially V-shaped groove 76 which is adapted to normally overlie and contact with the fold of the strip as it passes through the folding die. To prevent the heating iron 70 coming in contact with the upper sides of the folding die plates 66 and heating the same, a horizontal rest pin 77 is provided which is supported at its ends in suitable ears 78 formed on the upper side of the carrier 73 and upon which the heater-arm 71 is adapted to rest when the celluloid strip is removed from the machine.

For the purpose of yieldingly holding the heating iron 70 with sufficient pressure in engagement with the fold of the celluloid strip, a spring catch 79 is provided which abuts against a rearwardly-facing shoulder 80 formed on the upper side of the heater-arm 71 above the fulcrum thereof. This catch is preferably in the form of a sliding rod 81, as shown in Figure 6, and is guided in a vertically-swinging holder 82 fulcrumed on the carrier 73. When it is desired to swing the heater back out of its operative position for gaining access to the folding dies, the catch 79 is released from engagement with the shoulder 80 and swung rearwardly, allowing said heater arm to be moved in the same direction.

From the folding dies, the strip passes lengthwise of the machine through the passage 83 formed in the block 74 and during which time the strip is allowed to cool. As shown in Fig. 13, this passage is of a height to receive the folded strip and is preferably comparatively narrow at its lower end while the opposing side walls at its upper end gradually diverge upwardly to the point 84 where it opens into an upright slot 85 in which a pressure or follower plate 86 is guided. The bottom face of this plate rests on the top of the fold of the strip, a flat spring 87 bearing on its top face, urging this plate downwardly with sufficient pressure to flatten the fold, as shown in Fig. 13, and preventing the strip creeping upwardly in the passage 83.

The carrier 73 upon which the heater arm is mounted is preferably adjustable lengthwise of the machine for the purpose of bringing the heating iron 70 in its proper position over the tapered opening 67 of the folding dies, and thereby regulates the width of the index tubes. To this end, the carrier is provided adjacent its rear end with a hand operated worm 88 which meshes with a worm wheel 89 engaging a horizontal gear rack 90 applied to the upper rear side of the carrier block 74. By rotating the worm through the medium of its knob 91 in one direction or the other, the carrier is moved forwardly or backwardly to bring its heating iron in the desired position relative to the opening between the die-plates 66, 66. Advancing the heater toward the wide end of the opening between the die-plates increases the width of the tube while moving the heater toward the narrow end of said opening decreases the width of the tube. By this construction, the size of the tube as to the width of the pocket for receiving the customary index slip may be conveniently regulated without dismembering any part of the machine.

After passing through the block 74, the folded strip is fed between front and rear sets of feed rollers 92, 93 respectively, arranged side by side in spaced relation. The feed rollers 92 of the front set are provided in their peripheries with undercut annular grooves 94 which embrace the tube in the manner shown in Fig. 14. To prevent these feed rollers from crushing the tube while passing between them, they are preferably provided with a core 95 of a suitable cushioning material, such as rubber, while the main or outer portion of the rollers are made of steel or other appropriate material. The rollers of each set are detachably mounted at the upper end of upright shafts 96, 97, respectively, journaled in suitable bearings in the super-frame of the machine. Each of said shafts is provided with a worm-wheel 98 which meshes with a worm 99 mounted on the longitudinal shaft 52 which drives the feed rollers 36, 37 at the front end of the machine, the shafts of each set of rollers 92, 93 being located on opposite sides of said longitudinal shaft, whereby their worm wheels engage opposite sides of the companion worm 99 for driving the last-named feed rollers in opposite directions at a uniform speed.

Means are located in the space provided between both sets of feed rollers 92, 93 for bending or forming the inturned lip 27 on one of the side walls of the folded strip. In the preferred construction of this mechanism, shown particularly in Figs. 4, 6, 15, 16, 17 and 21, the same is constructed as follows:

The numeral 100 indicates a spreader or separating blade arranged in an upright position lengthwise of the machine in the path of movement of the folded strip between the front and rear sets of feed rollers. Immediately ater leaving the front set of feed rollers 92, this strip engages the front end of this blade, which functions to separate the side walls of the strip from the contracted position shown in Figure 14 to the position shown in Figure 15, wherein said walls are substantially parallel. Mounted on one side of the longitudinal center line of the machine between the front and rear sets of feed rollers, is a suitable holder 101 which carries a horizontally disposed heating iron 102 which extends transversely into the path of one of the side walls of the folded strip and serves to engage its lower end to force it inwardly against the opposite wall and thereby form the retaining lip 27 of the tube.

As shown in Fig. 21, the operating end or face 103 of this heating iron is cut at an angle whereby its leading end serves to guide the lower edge of the strip on to such face which gradually extends rearwardly and inwardly to properly bend the lower end of the strip wall inwardly and upwardly to the position shown in Figure 16, giving said lip 27 a permanent set. While being acted upon by this heater, the folded strip passes over a core 104 which forms a rearward extension of the separating blade 100 and overhangs the operating end of the heating iron. The cross-sectional area of this core is substantially the same as that of the pocket of the finished tube, said core serving to properly support the walls of the tube while being acted upon by the heating iron in forming the retaining lip 27. The heater shown in the drawings consists of a coil of wire 105 wound around the heater iron and having its ends connected to a suitable source of electricity, an insulated covering 106 being preferably wrapped around the wire.

Cooperating with the heating iron 103 and arranged in the space between the front and rear sets of feed rollers 92, 93 and on the opposite side of the center line of the machine is a support 107 on whose inner face is mounted a vertically-adjustable plate 108 provided near its lower end with a downwardly facing shoulder 109 which overhangs the upper side of the core 104 extending from the rear end of the separating blade 100. As shown in Fig. 16, this plate extends over the top and that adjoining side wall of the folded strip opposite to the one from which the inturned lip 27 is formed. This plate, together with the core 104, serves to reliably support the folded strip as it passes from the front set to the rear set of feed rollers and prevents the strip from buckling during the bending operation. Incidentally the plate 108 is vertically adjustable to bring its shoulder 109 at the desired distance above the upper edge of the core 104, and thereby regulate the height of the pocket to be formed. For this purpose, the adjusting plate is suitably guided for vertical movement on the inner face of its support and an adjusting screw 110 is provided which engages a threaded bore 111 formed in the body portion of the plate. By turning this adjusting screw in one direction or the other, said plate is correspondingly raised or lowered relatively to the core.

After being operated upon by the heater to form the retaining lip 27 on the index tube and preparatory to passing between the rear set of feed rollers 93, said lip is passed through a horizontal slot 112 formed between the core 104 and a plate 113 arranged directly below it, as shown in Figs. 6 and 17. This slot is inclined in a direction transversely of the machine to properly shape or bend the lip slightly above the horizontal, the strip being guided into said slot by the heating iron 102.

One of the rear sets of rollers 93, 93 is provided with a peripheral groove 114 for receiving the pocket portion of the tube, while the other roller is ungrooved and engages the flat side of the tube. From this rear set of feed rollers, the completed strip of index-tubing passes through a longitudinal passage 115 formed in the extension-arm 31 of the super-frame of the machine, after which it is cut into predetermined lengths ready for use.

The cutting mechanism for severing the continuous tube into the desired lengths is shown in Figs. 7, 8, 9, 10 and 11 and is preferably constructed as follows:—

Arranged at the outer end of the extension arm 31 of the super-frame of the machine is a longitudinally movable cutter-head 116 which is provided with a longitudinal opening 117 forming a continuation of the index-tube passage 115 formed in said extension arm. A block 118 is mounted on the upper side of the cutter-head and carries a stationary cutter or blade 119 whose cutting edge is disposed at the discharge end of the index-tube passage. Cooperating with this stationary cutter is a rotatable cutter 120 which is adapted to traverse the discharge end of the opening 117 and which is mounted on a longitudinal shaft preferably constructed of two telescopic sections 121, 122 which are keyed together to rotate in unison but are permitted longitudinal movement relative to each other. The shaft section 121 may be suitably journaled in the extension arm 31, while the shaft section 122, which is movable with the cross-head, is provided at its rear end with a reduced portion 123 engaging the cutter-head, the rear wall of the latter abutting against the resulting shoulder 124 formed by the reduced shaft-portion and the rotatable cutter bearing against the outer end of said head, as shown in Figs. 7 and 8. This rotary cutter is revolved at a uniform speed, and for this purpose, the inner shaft section 121 is provided at its front end with a bevel gear 125 which meshes with a similar gear 126 mounted at the upper end of an upright shaft 127 journaled in the extension arm 31. At its lower end, this upright shaft carries a gear wheel 128 meshing with a gear wheel 129 mounted on a short upright shaft 130 depending from an adjustable slide-block 131 guided for movement lengthwise of the extension arm in a suitable guideway 132. Said gear 129 in turn meshes with a pinion 133 mounted at the lower end of an upright shaft 134 journaled in the front portion of the extension arm and provided at its upper end with a bevel gear 135 meshing with a similar gear 136 mounted on a longitudinal shaft 137 journaled in suitable bearings formed on the super-frame and its extension arm, as shown in Figs. 6 and 7. This longitudinal shaft also carries a spur gear 138 which meshes with an idler gear 139 in turn meshing with a driven gear 140 mounted at the rear end of the longitudinal driving shaft 52. Through the medium of this train of gearing, the cutter 120 is rotated at the proper speed to cut the index tube strip into predetermined lengths. Should it be desired to cut the strip into tube-lengths different from that for which the machine is presently designed, it is only necessary to change the ratio of the gears 128, 129. For tubes of shorter lengths, the gear 128 is smaller than its companion gear 129 and for tubes of greater length, the gear 128 is larger than the companion gear 129, the speed of rotation of the cutter being correspondingly faster or slower. The replacement of these gears is readily effected by removing their retaining nuts 141, 142 respectively, the intermediate gear 129 which is mounted on the shaft 130 carried by the slide-block 131 being adjustable in its guideway relative to the axis of the gear 128 and driving pinion 133.

Means are provided for intermittently reciprocating the cutter-head 116 lengthwise of the machine at a predetermined point in the cycle of operations of the machine, whereby said head moves at the same speed of travel as the index tubes. To this end, the cutter-head is provided at its opposite sides with parallel guide-rods 143 engaging openings 144 formed in the corresponding sides of the extension arm 31. Coil springs 144ª connected to these guide rods serve to resist movement of the cutter-head out of its normal retracted position, shown by full lines in Figs. 7, 8 and 10. The cutter head is advanced forwardly at a predetermined point in the cycle of operations of the machine by an automatically-controlled driving mechanism, and for this purpose, the inner ends of the guide rods are provided on their undersides with horizontal gear racks 145 which mesh with pinions 146 mounted on a transverse shaft 147 journaled at its ends in the opposite sides of the extension arm of the super-frame. This shaft also carries a gear 148 which meshes with a similar gear 149 loosely mounted on the longitudinal shaft 137. Said gear 149 is provided with a clutch face or collar 150 with which a slidable clutch collar 151 splined on the shaft 137 is adapted to intermittently engage at regular intervals for transmitting motion to the transverse shaft 147 and thence to the gear racks 145 for moving the cutter-head forwardly.

The clutch 150, 151 is automatically engaged and released to effect the forward and backward movement of the cutter-head at the proper time, and the same is by preference indirectly controlled by mechanism actuated from the upright shaft 127, which transmits motion to the rotary cutter. Fixed on this shaft above the gear 128 is a cam 152 with which a horizontally swinging lever 153 fulcrumed at 154, is adapted to engage the outer arm of said lever being connected by a link 155 with a vertically-swinging rock arm 156 mounted on the outer end of a rock shaft 157 journaled at its ends in the extension arm 31. This rock shaft carries a clutch-actuating lever 158 which is operatively connected to the movable clutch member 151. A coil spring 159 connected to the rock arm serves constantly to maintain the lever 153 in contact with the periphery of the cam 152 and to swing the clutch lever 158 in the proper direction to engage the clutch. The cam and the rotary cutter are so timed relatively to each other, that, when the cutter is in the position shown in Fig. 11, just prior to traversing the discharge end of the index-tube passage 117, the lever is in the position shown by full lines in Fig. 9, ready to rock inwardly under the influence of the spring into the depression of the cam. When this happens, the actuating lever 158 is moved in the proper direction to engage the clutch and cause the cutter-head to advance with the index tube. During the time the lever 153 is in engagement with the depression of the cam, the rotary cutter is traversing the discharge end of the index-tube passage and severs a predetermined length of the tube. Also during this period the cutter head is advanced at approximately the same speed as that of the index tube strip, thereby insuring the cutting of the strips into equal lengths without interfering with the continuous and uniform feeding of the strip through the machine. As soon as the lever 153 moves out of the depression in the cam, the clutch is again released and the cutter-head is returned to its initial retracted position by the spring 144ª.

For the purpose of adjusting the feed rollers 92, 93 of each set toward and from each other and thereby regulate the pressure between them, each of said rollers is provided with an eccentric sleeve or bushing 160 which is loosely mounted on the shaft 96 or 97 of the respective roller, the exterior face of this eccentric bushing engaging the circular bore of a neck 161 depending from the top of the super-frame 30 and through which said shaft extends. At its upper end, the eccentric bushing is provided with a flange 162 having a suitable handle 163 for turning it.

Suitably mounted on the front end of the machine are two electric switches 164, 165, one for controlling the motor 46 and the other for controlling the electric heater 70, 102.

In order to conveniently catch the finished index-tubes after being cut into the lengths desired, a pan or basket 166 is provided which may be attached to a bracket 167 secured to the pedestal 29.

Briefly stated the operation of the machine is as follows:

The electric motor 46 is started to drive the various rotating mechanisms of the machine and the celluloid strip 34 is then properly threaded between the feed rollers 36, 37. After passing between these feed rollers, the strip is fed to the folding dies 66, 66' which doubles the strip lengthwise upon itself in the manner shown in Fig. 12. While passing through this folding die, the folded portion of the strip contacts with the electric heater 70, after which it passes through the block 74 to the front set of feed rollers 92. Upon emerging from this set of rollers, and before passing between the near set of rollers 93, one of the walls of the strip is bent inwardly by the heating iron 102 as shown in Fig. 16. The folded strip now passes between the rear set of feed rollers and thence through the discharge passage 115 to the rear end of the machine where the completed strip is cut into uniform lengths as heretofore described. The various operations performed on the strip as it passes through the machine are automatic and after being once started, the machine requires no further attention except for replacing an additional reel of the celluloid strip when required.

In the modified form of the invention shown in Figs. 25 to 32 inclusive, the machine is more particularly intended for making tubes or sheaths of the type illustrated in Fig. 24, which sheaths are usually secured to the lower edge of a support or holder and form a pocket for detachably receiving an index card. These sheaths are made of a doubled-strip of celluloid or similar material folded at 168 and having a front wall 170 and a rear wall 169 of less height than the latter and terminating at its free end in a reversely-bent lip 171.

This strip of celluloid from which the sheathing is made is guided on a grooved plate 172 and presented between upper and lower feed rollers 173, 174, as in the previously described construction, the groove 175 of said plate being slightly offset relative to the circumferential center line of the feed rollers, as shown in Fig. 25. From the feed rollers, the strip passes through folding dies 176, being doubled about a longitudinal core member or separating rail 177, as shown in Figs. 27 and 28. At its rear end, this core member terminates in an overhanging extension 178 beneath which a suitable bending die in the form of a heating iron 179 is disposed. This heater extends transversely into the path of one of the side walls of the folded strip, as in the construction heretofore described, and forms the inturned lip 171 thereon in the manner shown in Fig. 29. Following this operation, the lip 171 encounters a deflecting member or blade 180 which bends the same upwardly, as shown in Fig. 30. A pair of feed rollers 181 having undercut grooves 182 in their peripheries propel the folded strip on through the machine and at the same time press the lip 171 firmly between the opposing side walls of the strip. Upon emerging from these feed rollers, the fold of the strip engages a suitable heater iron 183, similar to the heater 70 previously described, which acts to properly maintain the fold in shape. A set of rollers 184 arranged in advance of the heater iron 183 serves to advance the strip to the cutting mechanism.

It is to be understood that this machine and method for making index tubes of the character described may be modified in various other respects within the scope of the appended claims and I do not therefore wish to be limited to the particular embodiments of the invention herein shown and described.

I claim as my invention:—

1. A machine for making index tubes of the character described, comprising a supporting frame, means for feeding the tube-forming strip through the machine, means for folding said strip lengthwise upon itself, means for bending a portion of one of the resulting side walls thus formed toward the opposing side wall, and means for severing the formed strip into predetermined lengths.

2. A machine for making index tubes of the character described, comprising a supporting frame, means for feeding the tube-forming strip lengthwise through the machine, means for folding the strip lengthwise upon itself, a stationary guide member adapted to support one of said folded walls, means for bending the lower portion of one of the walls of the folded strip toward the opposing wall thereof, and shaping devices between which the folded strip is adapted to pass.

3. A machine for making index tubes of the character described, comprising a supporting frame, means for feeding the tube-forming strip through the machine, means for folding said strip lengthwise upon itself, means for subjecting the strip to electrically generated heat while passing through said folding means, and means for subjecting the fold thus formed to pressure.

4. A machine for making index tubes of the character described, comprising a supporting frame, means for feeding the tube-forming strip through the machine, means for folding the strip lengthwise upon itself, and combined heating and bending means for folding one of the walls of the folded strip against the other wall thereof.

5. A machine for making index tubes of the character described, comprising a supporting frame, means for feeding the tube-forming strip through the machine, means for folding the strip lengthwise upon itself, a bending die arranged transversely of the path of movement of the folded strip for bending one of its walls inwardly toward the other wall, means for supporting the strip while bending said wall inwardly, and means for severing the formed strip into predetermined lengths.

6. A machine for making index tubes of the character described, comprising a supporting frame, means for feeding the tube-forming strip through the machine, means for folding the strip lengthwise upon itself, a bending die arranged transversely of the path of movement of the folded strip for bending one of its walls inwardly toward the other wall, the operating face of said bending die being at an angle to the path of movement of said strip with its leading end clearing the opposing wall of the latter and its opposite end extending across the space between the side walls of the strip, and means for severing the formed strip into predetermined lengths.

7. A machine for making index tubes of the character described, comprising a supporting frame, means for feeding the tube-forming strip through the machine, means for folding said strip lengthwise upon itself, means for supporting the folded strip after leaving said folding means, and means arranged in the path of movement of one of the side walls of the folded strip and below the plane of said supporting means for bending such side wall toward the other wall of the folded strip.

8. A machine for making index tubes of the character described, comprising a supporting frame, means for feeding the tube-forming strip lengthwise through the machine, means for folding the strip lengthwise upon itself, means for supporting and separating the side walls of the folded strip, and a bending die arranged in the path of movement of one of the side walls of the folded strip for bending it inwardly toward the other wall thereof, said die being disposed transversely relatively to the path of movement of the folded strip and having its operating end arranged beneath the adjacent underside of said supporting and separating means.

9. A machine for making index tubes of the character described, comprising a supporting frame, means for folding the strip lengthwise upon itself, front and rear sets of feed devices arranged in advance of said folding means, means for guiding the folded strip as it passes from the front set to the rear set of feed devices, and means disposed between said feed devices for bending one of the side walls of the folded strip toward the opposing side wall thereof.

10. A machine for making index tubes of the character described, comprising a supporting frame, means for feeding the tube-forming strip through the machine, means for folding said strip lengthwise upon itself, means for bending a portion of one of the resulting side walls thus formed toward the opposing side wall, shaping means arranged in advance of said bending means for receiving such bent portion of the strip-wall, and means for severing said folded strip into predetermined lengths.

11. A machine for making index tubes of the character described, comprising a supporting frame, means for feeding the tube-forming strip through the machine, means for folding said strip lengthwise upon itself, means for bending a portion of one of the resulting side walls thus formed toward the opposing side wall, and shaping means arranged in advance of said bending means for receiving such bent portion of the strip-wall, said means including superposed plates having a longitudinal slot between them.

12. A machine for making index tubes of the character described, comprising a supporting frame, means for feeding the tube-forming strip through the machine, means for folding said strip lengthwise upon itself, means for bending a portion of one of the resulting side walls thus formed toward the opposing side wall, comprising a heated member arranged in the path of movement of said first-named side wall for bending a portion of the latter toward the opposite wall of the folded strip, and a member disposed in advance of said heated member for deflecting said bent portion upwardly.

13. A machine for making index tubes of the character described, comprising a supporting frame, means for feeding the tube-forming strip lengthwise through the machine, means for folding the strip lengthwise upon itself, a blade for separating the side walls of the folded strip, said blade having an overhanging extension at its front end, and a member arranged below the blade-extension on one side thereof and in the path of movement of one of the side walls of the folded strip for bending its free end inwardly toward the other wall thereof, said blade-extension forming a support for the strip while being bent.

14. A machine for making index tubes of the character described, comprising a supporting frame, means for feeding the tube-forming strip lengthwise through the machine, means for folding the strip lengthwise upon itself, a blade for separating the side walls of the folded strip, said blade having an overhanging extension at its front end, a member arranged below the blade-extension on one side thereof and in the path of movement of one of the side walls of the folded strip for bending its free end inwardly toward the other wall thereof, said blade-extension forming a support for the strip while being bent, and a plate located in advance of said bending member and below the extension of said separating blade, the opposing edges of said plate and extension being vertically spaced to form a passage for the reception of the bent portion of said strip.

15. A machine for making index tubes of the character described, comprising a supporting frame, means for feeding the tube-forming strip lengthwise through the machine, means for folding the strip lengthwise upon itself, a blade for separating the side walls of the folded strip, said blade having an overhanging extension at its front end, a member arranged below the blade-extension on one side thereof and in the path of movement of one of the side walls of the folded strip for bending its free end inwardly toward the other wall thereof, said blade-extension forming a support for the strip while being bent, and a second member arranged on the opposite side of said blade-extension and constructed to engage the fold and adjoining side wall of said strip.

16. A machine for making index tubes of the character described, comprising a supporting frame, means for feeding the tube-forming strip lengthwise through the machine, means for folding the strip lengthwise upon itself, a blade for separating the side walls of the folded strip, said blade having an overhanging extension at its front end, a member arranged below the blade-extension on one side thereof and in the path of movement of one of the side walls of the folded strip for bending its free end inwardly toward the other wall thereof, said blade-extension forming a support for the strip while being bent, a plate arranged on the opposite side of said blade-extension and constructed to bear against the fold and adjoining side wall of the strip, and means for adjusting said plate vertically relatively to said blade extension to accommodate strips of different widths.

17. A machine for making index tubes of the character described, comprising a supporting frame, means for folding said strip lengthwise upon itself, two sets of feed rollers arranged in advance of said folding means for moving said strip with a continuous motion and between which the folded strip passes, the first set of rollers having annular grooves in their peripheries for the reception of the strip means disposed between the two sets of feed rollers for bending one of the resulting side walls of the folded strip toward the other wall thereof to form a pocket for receiving an index-slip, one of the feed rollers of the second set having an annular groove in its periphery for the reception of the pocket thus formed, and means for severing the folded strip into predetermined lengths during the continuous motion thereof.

18. A machine for making index tubes of the character described, comprising a supporting frame, and means for guiding the tube-forming strip through the machine, including a pair of feed rollers between which the strip is propelled, one of said feed rollers being mounted for oscillating movement about an axis eccentric to its axis of rotation, and means for resisting oscillation of said feed roller in a direction away from its companion feed roller.

19. A machine for making index tubes of the character described, comprising a supporting frame, and means for guiding the tube forming strip through the machine, including a pair of feed rollers between which the strip is propelled, trunnions in which the ends of one of said rollers are eccentrically mounted, and means for constantly turning said trunnions in a direction to bring the corresponding feed roller into frictional engagement with its companion feed roller.

20. A machine for making index tubes of the character described, comprising a supporting frame, and means for guiding the tube-forming strip through the machine, including a pair of feed rollers between which the strip is propelled, trunnions in which the ends of one of said rollers are eccentrically mounted, pins carried by the trunnions, and yieldable means engaging said pins for resisting turning of said trunnions in a direction to move the corresponding feed roller out of peripheral contact with its companion feed roller.

21. A machine for making index tubes of the character described, comprising a supporting frame, and means for guiding the tube-forming strip through the machine, including a pair of feed rollers between which the strip is propelled, trunnions in which the ends of one of said rollers are eccentrically mounted, radial pins carried by the trunnions, plungers guided in said frame and engaging the free ends of said pins and coil springs bearing against said plungers for resisting movement of the latter and said trunnions in one direction.

22. A machine for making index tubes of the character described, comprising a supporting frame, and means for guiding the tube-forming strip through the machine, including a pair of feed rollers between which the strip is propelled, said roller having annular grooves in their peripheries, and guide tongues on the rear side of the intersection of said rollers between which the strip is adapted to pass, said tongues extending part way into said grooves.

23. A machine for making index tubes of the character described, comprising a supporting frame, means for folding a tube-forming strip lengthwise upon itself, and means for feeding and guiding the strip to said folding means, including a pair of feed rollers, each having an annular groove in its periphery, and spaced superposed guide tongues disposed between said folding means and said feed rollers for guiding the strip from the latter to the folding means, said tongues extending into the opposing portions of the roller-grooves.

24. A machine for making index tubes of the character described, comprising a supporting frame, means for guiding the tube-forming strip through the machine, means for folding said strip lengthwise upon itself, means for subjecting the fold of the strip to heat while passing through said folding means, a block through which said strip passes in its folded state, and a pressure plate mounted in said block and normally engaging the top of the folded strip.

25. A machine for making index tubes of the character described, comprising a supporting frame, means for guiding the tube-forming strip through the machine, means for folding said strip lengthwise upon itself, means for subjecting the fold of the strip to heat while passing through said folding means, and means for adjusting said heat-subjecting means lengthwise of said folding means to regulate the width of the fold.

26. A machine for making index tubes of the character described, comprising a supporting frame, means for guiding the tube-forming strip through the machine, means for folding said strip lengthwise upon itself, including a die having an opening in its top through which the folded end of the strip projects, said opening tapering from its front toward its rear end, means for subjecting the fold of the strip to heat while passing through the folding die, and means for adjusting said heat-subjecting means lengthwise of said die-openings to regulate the width of the fold.

27. A machine for making index tubes of the character described, comprising a supporting frame, means for guiding the tube-forming strip through the machine, and means for folding said strip lengthwise upon itself, consisting of two plates arranged lengthwise of said frame and spaced apart transversely from end to end thereof to form a longitudinal opening tapered from the front to the rear end thereof, the opposing faces of said plates being approximately spiral-like in form.

28. A machine for making index tubes of the character described, comprising a supporting frame, means for guiding the tube-forming strip through the machine, means for folding said strip lengthwise upon itself, a vertically-swinging heating device mounted on said frame for engagement with the fold of the strip and means for yieldingly holding said heating device in engagement with said strip-fold.

29. A machine for making index tubes of the character described, comprising a supporting frame, means for guiding the tube-forming strip through the machine, means for folding said strip lengthwise upon itself, a vertically-swinging heating device mounted on said frame for engagement with the fold of the strip, and means for positively limiting the downward swinging movement of said heating device.

30. A machine for making index tubes of the character described, comprising a supporting frame, means for guiding the tube-forming strip through the machine, means for folding said strip lengthwise upon itself, a block having an opening through which said strip passes in its folded state, a pressure plate guided for vertical movement in said block and normally engaging the top of the folded strip, an adjustable carrier mounted on said block, and a vertically-swinging heating device fulcrumed on said carrier and arranged to engage the fold of the strip as it passes through said folding means.

31. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a movable cutter, and means for advancing said cutter-head with the strip at predetermined intervals in the cycle of operations of the machine.

32. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, automatic means for advancing the cutter-head with the strip at predetermined intervals, and means for returning said cutter-head to its initial position.

33. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head, having a rotary-cutter, means for rotating said cutter, automatic means controlled by said cutter rotating means for advancing the cutter-head with the strip at predetermined intervals, and means for returning said cutter-head to its initial position.

34. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, means for rotating said cutter, means for advancing said cutter-head with the strip at predetermined intervals, and means actuated by said cutter-rotating means for controlling the cutter-head advancing means.

35. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, a driving shaft, gearing for imparting motion from said driving shaft to the rotary cutter, separate gearing for reciprocating said cutter-head, and a clutch included in the gearing of the latter for controlling the reciprocation of the cutter-head at predetermined intervals.

36. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, a driving shaft, gearing for imparting motion from said driving shaft to the rotary cutter, separate gearing for reciprocating said cutter-head, a clutch included in the gearing of the latter, and means operatively connected with said first-named gearing for actuating said clutch at predetermined intervals.

37. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, means for rotating said cutter, means for advancing said cutter-head with the strip at predetermined intervals, and means for controlling the cutter-head advancing means including a clutch, a cam associated with said cutter-rotating means, a rock lever engaging said cam, and a connection between said rock lever and said clutch.

38. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, rods attached to the cutter head and guided in said frame, gear racks on said rods, pinions meshing with said racks, a driving shaft geared to said pinions, a clutch for controlling said pinions to advance the cutter-head at predetermined intervals, and springs applied to said cutter-head for resisting its advance movement.

39. A machine for making index tubes of the character described, comprising a supporting frame, means for continuously feeding the tube-forming strip through the machine, means for folding said strip lengthwise upon itself, and means for cutting the folded strip into desired lengths, consisting of a reciprocating cutter-head having a rotary cutter, a driving shaft, and gearing interposed between said driving shaft and said rotary cutter, said gearing including a pair of replaceable gears for changing the speed of rotation of said cutter.

40. The method of making index tubes of the character described, which consists of folding a tube-forming strip lengthwise upon itself, subjecting the free end of one of the resulting side walls of the folded strip to electrically generated heat, and then bending said end inwardly to the opposite wall thereof.

41. The method of making index tubes of the character described, which consists of folding a tube-forming stripe lengthwise upon itself, subjecting the fold of the strip to heat, applying pressure to said fold, and bending the free end of one of the side walls of the folded strip toward the opposite wall thereof.

42. The method of making index tubes of the character described, which consists of folding a tube-forming strip lengthwise upon itself, subjecting the fold of the strip to heat, applying pressure to said fold, subjecting the free end of one of the resulting side walls of the folded strip to heat, and bending such free end inwardly toward the opposite wall of the strip.

43. The method of making a longitudinally folded strip from a flat strip of material which includes bending said strip longitudinally of itself, and applying heat to the folded portion only, while retaining the remaining portions in folded relation.

44. A machine for making a longitudinally folded strip from a flat strip of material comprising means for folding said strip, means for continuously moving said strip past the folding means, and means for applying heat to a portion only of said strip while retained by said folding means, said last named means being independent of connection with the folding means and formed to apply heat to the bend portion only.

RALPH F. TABER.